(12) United States Patent
Tang et al.

(10) Patent No.: US 11,150,510 B2
(45) Date of Patent: Oct. 19, 2021

(54) BACKLIGHT MODULE AND DISPLAY TERMINAL

(71) Applicant: Qingdao Hisense Electronics Co., Ltd., Shandong (CN)

(72) Inventors: Zhiqiang Tang, Shandong (CN); Jianguo Han, Shandong (CN); Ji Ma, Shandong (CN); Yu Chen, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 16/563,134

(22) Filed: Sep. 6, 2019

(65) Prior Publication Data

US 2020/0012151 A1 Jan. 9, 2020

Related U.S. Application Data

(63) Continuation of application No. PCT/CN2019/091343, filed on Jun. 14, 2019.

(30) Foreign Application Priority Data

Jul. 4, 2018 (CN) .......................... 201810724734.2
Jul. 4, 2018 (CN) .......................... 201821054388.3

(51) Int. Cl.
*G02F 1/13357* (2006.01)
*G02F 1/1335* (2006.01)

(52) U.S. Cl.
CPC .. *G02F 1/133603* (2013.01); *G02F 1/133608* (2013.01); *G02F 1/133612* (2021.01)

(58) Field of Classification Search
CPC ......... G02F 1/133603; G02F 1/133605; G02F 1/133608; G02F 2001/133612

USPC ....................................................... 362/97.3
See application file for complete search history.

(56) References Cited

U.S. PATENT DOCUMENTS

| 2007/0297163 | A1 | 12/2007 | Yong et al. | |
| 2012/0092562 | A1* | 4/2012 | Omiya | F16B 5/125 348/725 |
| 2012/0105737 | A1* | 5/2012 | Kuromizu | H05K 1/142 348/739 |

(Continued)

FOREIGN PATENT DOCUMENTS

| CN | 101097345 A | 1/2008 |
| CN | 203241667 U | 10/2013 |

(Continued)

OTHER PUBLICATIONS

ISA State Intellectual Property Office of the People's Republic of China, International Search Report Issued in Application No. PCT/CN2019/091343, dated Sep. 23, 2019, WIPO, 5 pages.

*Primary Examiner* — Andrew J Coughlin
*Assistant Examiner* — Jessica M Apenteng
(74) *Attorney, Agent, or Firm* — Crowell & Moring LLP

(57) ABSTRACT

A backlight module and a display terminal are disclosed. As an example, the backlight module includes at least one lamp board, a plurality of LED lamps, and at least one wire terminal. The at least one lamp board includes a first surface and a second surface opposite to the first surface. The plurality of LED lamps is arranged in an array on the first surface. The at least one wire terminal is disposed on the second surface and electrically connected to the plurality of LED lamps.

16 Claims, 6 Drawing Sheets

(56) References Cited

U.S. PATENT DOCUMENTS

2015/0023001 A1  1/2015  Sang et al.

FOREIGN PATENT DOCUMENTS

| CN | 204494218 U | 7/2015 |
| CN | 108732822 A | 11/2018 |
| CN | 208569252 U | 3/2019 |
| KR | 20100002453 A | 1/2010 |

\* cited by examiner

US 11,150,510 B2

BACKLIGHT MODULE AND DISPLAY TERMINAL

CROSS-REFERENCE TO RELATED APPLICATIONS

The present application is a continuation application of International Application No. PCT/CN2019/091343 filed on Jun. 14, 2019, which claims priority to Chinese Patent Application No. 201821054388.3, filed on Jul. 4, 2018, and Chinese patent No. 201810724734.2, filed on Jul. 4, 2018, which are hereby incorporated by reference in their entireties.

TECHNICAL FIELD

The present disclosure relates to LCD television technologies, and in particular to a backlight module and a display device.

BACKGROUND

Aesthetically appealing ultra-thin LCD TVs are widely used. Ultra-thinness is becoming a goal of all manufacturers. There is need for manufacturers to produce ultra-thin LCD TVs.

SUMMARY

In a first aspect, a backlight module is provided according to some embodiments of the present disclosure, including: at least one lamp board, a plurality of light emitting diode (LED) lamps, and at least one wire terminal. The at least one lamp board includes a first surface and a second surface opposite to the first surface. The plurality of LED lamps are arranged in an array on the first surface. The at least one wire terminal is disposed on and attached to the second surface and electrically connected to the plurality of LED lamps.

In a second aspect, a display terminal is provided according to some embodiments of the present disclosure, including a backlight module, and a display panel disposed in a light emitting direction of the backlight module. The backlight module includes at least one lamp board, a plurality of light emitting diode (LED) lamps, and at least one wire terminal. The at least one lamp board includes a first surface and a second surface opposite to the first surface. The plurality of LED lamps are arranged in an array on the first surface. The at least one wire terminal is disposed on and attached to the second surface and electrically connected to the plurality of LED lamps.

Both the general description above and the detailed description below are merely exemplary and explanatory and do not limit the scope of the present disclosure.

BRIEF DESCRIPTION OF THE DRAWINGS

To describe the technical solution of the present disclosure more clearly, a brief description of the drawings for the embodiments is given below. It is apparent that other drawings may be derived by those having ordinary skill in the art based on these drawings without any creative effort.

DETAILED DESCRIPTION OF THE EMBODIMENTS

In order to provide those of ordinary skill in the art better understanding of the embodiments of the present disclosure, the embodiments are described below with reference to the accompanying drawings. The embodiments described below are merely examples rather than all of the embodiments of the present disclosure. In view of the embodiments in the present disclosure, all other embodiments that may be conceived and derived by a person of ordinary skill in the art without any creative effort shall fall within the scope of protection of the present disclosure.

Figure 1:
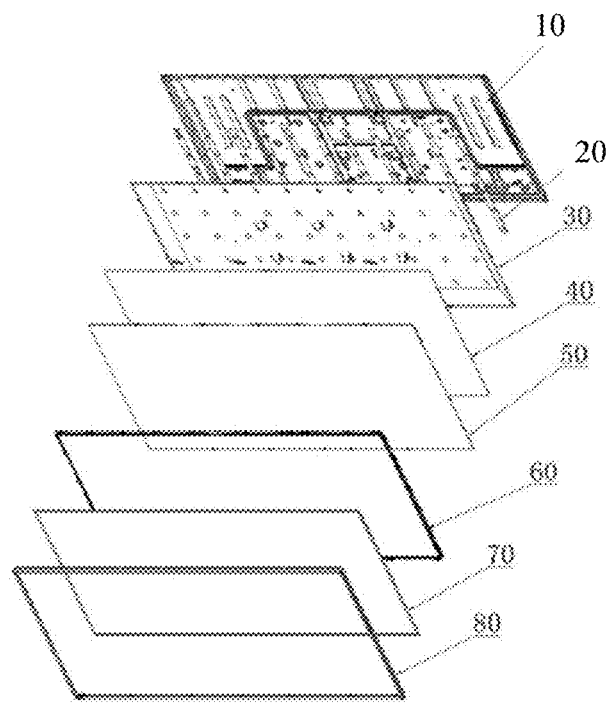
FIG. 1 is a cross-sectional diagram of a structure of a liquid crystal television according to some exemplary implementations.

FIG. 1 is a schematic diagram of a structure of a liquid crystal television according to some implementations. The liquid crystal television includes a backlight module, a liquid crystal panel 70 disposed on a light emitting side of the backlight module, and a rubber frame 60 and a front chassis 80 for sandwiching the liquid crystal panel 70. The backlight module includes a backplane 10, a reflector 30, a diffuser plate 40, and an optical film 50. A plurality of lamp strips 20 and a driving module for the lamp strips are disposed on the backplane 10. The lamp strips 20 are electrically connected to the driving module through at least one wire terminal, and the driving module is configured to control whether to drive the lamp strips 20 to emit light or not. Under the control of the driving module, light from the light strips 20 becomes uniformly distributed after passing through the diffuser plate 40 and the optical film 50, and is then uniformly irradiated onto the liquid crystal panel 70, causing the liquid crystal display device to be illuminated to produce images.

As the size of lamps on at least one lamp board in the backlight module shrinks, the light emitting diode (LED) units may reach a diameter of 1 mm and a height of 0.5 mm.

Therefore, for ultra-thin direct type LCD TVs with a thickness less than 5 mm, the size of wire terminals and connectors may be larger than the size of the lamps and may become a key factor that limits the thickness of the backlight module. Furthermore, due to the large number of lamps to be driven and stringent requirement on brightness, color gamut, and the number of backlight partitions in a direct-type backlight module, a power consumption of the backlight module may be at a high level, which in turn lead to increasing number of lamp boards and corresponding circuit areas or footprints occupied by the driving module. Due to the increasing number of the lamp boards, larger areas or footprints for the driving module, a large number of electric wires between the lamp boards and the driving module, and a large area needed for placing a power supply board, a main board, and other circuit boards, a large portion, usually 60% to 70%, of the backside of the backplane of the backlight module would be occupied by these circuit boards. As such, this portion of the backside of the backplane occupied with circuit boards cannot be directly exposed in the final backlight module. Therefore, only a small portion of the backplane unoccupied by circuit boards can be exposed and it may be necessary to package the backlight module using an additional large back cover to fully encapsulate the non-exposable portion of the backplane, resulting in a thick final backlight module. Moreover, since the backplane usually comprises a single-layer metal structure, reinforcement ribs may need to be added to a large-size backplane to increase its structural strength. As a result, connection wires may need to be routed on the outside of the backplane of the backlight module. These reinforcement ribs and wiring, if not encapsulated, would greatly affect the appearance of the final TV device.

In order to solve the above-mentioned problem, some embodiments of the present disclosure provide a backlight module which includes at least one wire terminal and LED lamps on two opposite surfaces of a lamp board, to reduce the number of connection wires on the backplane and increase the exposable area (area unoccupied by circuits) of the backplane, making the backplane directly function as the back cover of the backlight module and thus reducing the thickness of the backlight module.

Figure 3:
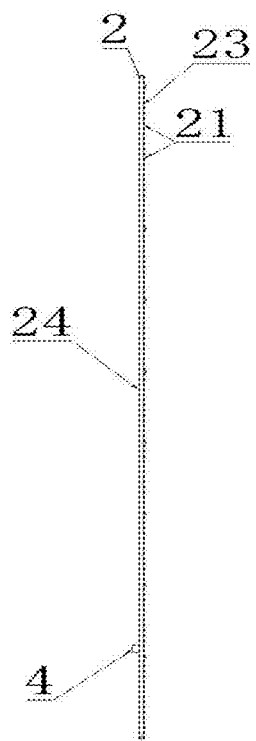
FIG. 3 is a cross-sectional diagram of a structure of a lamp board in a backlight module according to some embodiments of the present disclosure.
Figure 4:
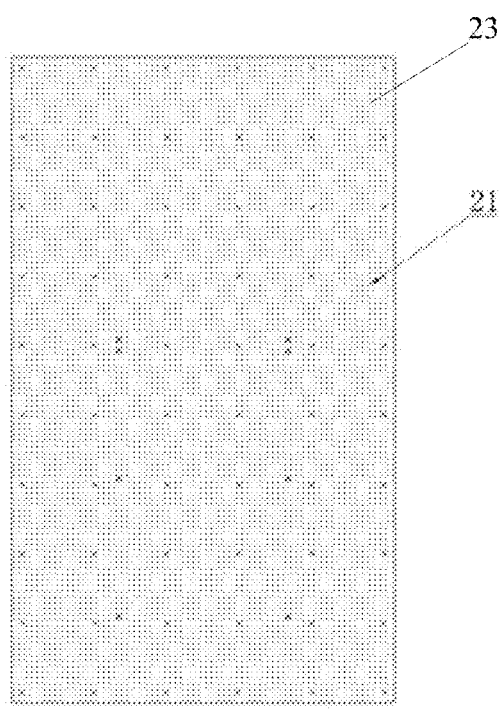
FIG. 4 is a schematic diagram of a first surface of a lamp board in a backlight module according to some embodiments of the present disclosure.

In some embodiments of the present disclosure, as shown in FIG. 3, the backlight module comprises at least one lamp board 2, wherein the lamp board 2 includes a first surface 23 and a second surface 24. The first surface 23 and the second surface 24 are two opposite surfaces of each of the at least one lamp board 2. The first surface 23 is provided with LED lamps 21. In FIG. 4, the LED lamps 21 are arranged in an array on the first surface 23. The second surface 24 is provided with the wire terminal 4, and the LED lamps 21 are electrically connected to the wire terminal 4.

In some examples, the wire terminal 4 is electrically connected to external modules in addition to being electrically connected to the LED lamps 21. Specifically, the wire terminal 4 is electrically connected to the LED lamps 21, and electrically connected to the driving module outside the at least one lamp board 2 through connection wires. The driving module is configured to drive the LED lamps 21, e.g., to control the light emission or on/off of the LED lamps.

Figure 2:
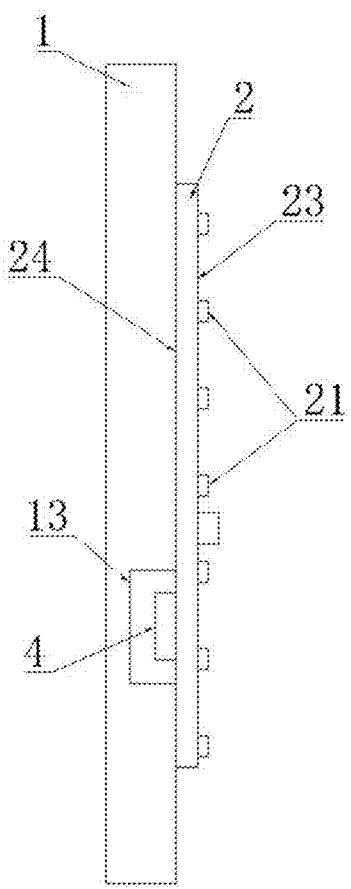
FIG. 2 is a schematic diagram of a structure of a backlight module according to some embodiments of the present disclosure.

The backlight module according to some embodiments of the present disclosure further includes a backplane 1. In FIG. 2, the backplane 1 is at a side facing the second surface 24 of the lamp board 2, at least one receptacle structure 13 for the wire terminal 4 is disposed or formed on the backplane 1, and the wire terminal 4 is accommodated inside the receptacle structure. By providing the receptacle structure 13, the thickness of the backlight module is reduced. In some implementations, the receptacle structure 13 may be in the form of a recess in the backplane. In assembling the backplane 1 and the lamp board 2, the wire terminal 4 is embedded or accommodated in the recess structure 13. As such, the size of the wire terminal is less of a factor in minimizing the thickness of the backlight module, thus helping reduce the overall thickness of the backlight module.

Figure 6:
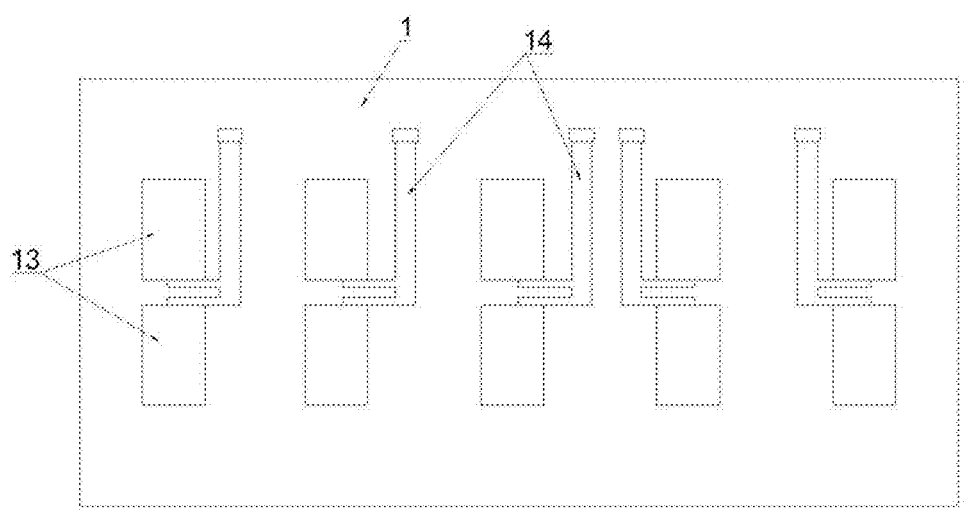
FIG. 6 is a schematic diagram of a structure of a backplane in a backlight module according to some embodiments of the present disclosure.

In FIG. 6, at least one wiring duct or wire routing structure 14 is provided on the backplane 1 for accommodating the at least one external wire connected to the at least one wire terminal 4. The at least one wire terminal 4 is electrically connected to the driving module on the backplane 1 through the at least one external wire. By accommodating the external wires inside the at least one wiring duct 14, the external wires from the wire terminal 4 to the driving module would not need excess space out of the surface of the backplane, thereby reducing a fitting gap between the backplane 1 and the lamp board 2. The wiring duct or wire routing structure 14 may comprises a recess structure formed on the backplane.

In some embodiments, the backplane 1 may comprise a single-layer structure. In order to enhance the structural strength of the backplane 1, in some examples, reinforcing ribs are provided on the inner side of the backplane 1, and the reinforcing ribs are disposed on the backplane such that they do not interfere with the receptacle structure 13 and the wiring duct 14. In some examples, the backplane 1 may be made of a high-strength metal material.

Figure 7:
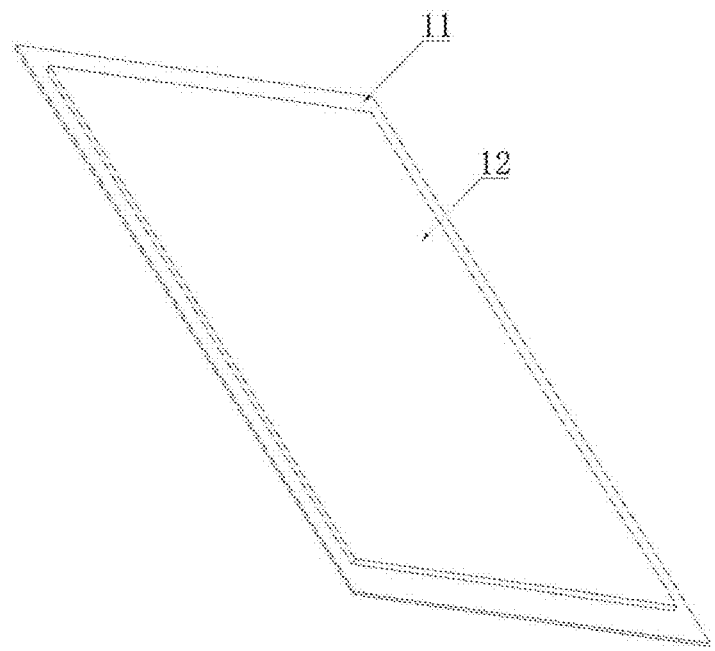
FIG. 7 is a schematic diagram of a structure of a composite backplane in a backlight module according to some embodiments of the present disclosure.
Figure 8:
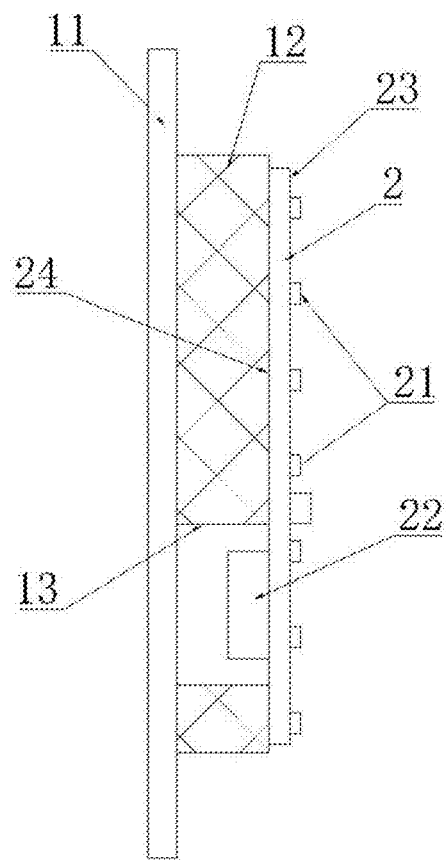
FIG. 8 is a cross sectional diagram of an assembly of a composite backplane and a lamp board in a backlight module according to some embodiments of the present disclosure.

In some embodiments, the backplane 1 may comprise a two-layer composite structure. In FIGS. 7 and 8, the backplane 1 includes an exterior backplane 11 and an inner backplane 12 fixed or attached to the exterior backplane 11. The receptacle structure is disposed on the inner backplane 12, with the wire terminal 4 accommodated in the receptacle structure of the inner backplane 12. According to some embodiments of the present disclosure, the receptacle structure on the inner backplane 12 may be in the form of an aperture or a recess formed on the inner backplane. For ease of processing, the receptacle structure may be formed by punching out an aperture on the inner backplane 12.

At least one wire routing structure is provided on the inner backplane 12. The at least one wire routing structure is configured to accommodate the at least one external wire connected with the at least one wire terminal 4, i.e., the at least one external wire from the at least one wire terminal 4 to the driving module is accommodated and routed inside the at least one wire routing structure. By accommodating the connection wire inside the wire routing structure on the inner backplane 12, the wires are routed and a disorganization of the connection wires (i.e., external wire in the disclosure) on the backplane 1 may be avoided. Furthermore, this design contributes to a reduction of the fitting gap between the inner backplane 12 and the at least one lamp board 2 as well. In some examples the wire routing structure is in the form of a recess or an aperture.

In these exemplary embodiments, the thickness of the inner backplane 12 may range from 1.0 to 4.0 mm, which allows the receptacle structure and the wire routing structure with a certain depth to be disposed on the inner backplane 12, ensuring that the wire terminal 4 and the external wires are completely embedded in and below the surface of the inner backplane 12. In order to provide the inner backplane 12 with a certain thickness but not excessive weight, the inner backplane 12 may be made of a thick light-weight material, such as an aluminum composite plate, a steel composite plate, or a honeycomb plate. A thickened lightweight plate is lighter than an ordinary metal material and thus facilitates processing and installation. Alternatively, the inner backplane 12 may be made of a relatively thin metallic planar material, and punched to form embossment, so as to form the receptacle structure and the wire routing structure to receive and accommodate the wire terminal 4 and the external wires.

In the example of two-layer backplane structure described above, the relatively large thickness of the composite inner backplane 12 or a gain in mechanical strength from embossing a thin metallic inner back plain 12 provides a backplane with better mechanical strength than conventional backplanes. As such, and the exterior backplane 11 of the backplane 1 may not need to be separately reinforced.

In some embodiments, the backplane 1 may include a three-layer composite structure: a first layer forming an inner backplane (e.g., an interior metallic layer); a second layer forming an interlayer, and a third layer forming an exterior backplane (e.g., an exterior metallic layer). The receptacle structure and the wire routing structure may be provided on the interior metallic layer so that the at least one wire terminal 4 and the at least one external wire are embedded and routed in the interior metallic layer.

Figure 5:
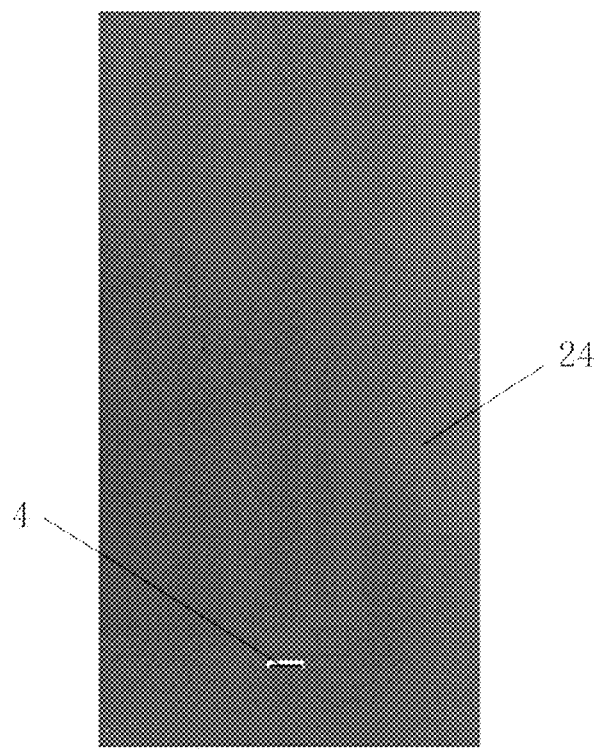
FIG. 5 is a schematic diagram of a second surface of a lamp board in a backlight module according to some embodiments of the present disclosure.

In the backlight module according to the embodiments of the present disclosure, multiple lamp boards 2 may be provided to meet the quantity requirement of LED lamps in the backlight module. For example, in FIG. 6, multiple receptacle structures 13 are correspondingly provided on the backplane. The multiple receptacle structures 13 are, for example, arranged in two rows in a width direction of the backplane 1 and the multiple receptacle structures are arranged at intervals in a length direction of the backplane 1. As shown in FIG. 5, the wire terminals 4 are located at one end of the lamp boards 2. Since the wires connected with the wire terminals 4 have a certain electric resistance, the length of the wires affects the voltage drop. In FIG. 6, the wire ducts 14 start from two adjacent ends of two receptacle structures 13 arranged in the width direction of the backplane 1, e.g., the multiple wire terminals 4 are located at two adjacent ends of each pair of the multiple lamp board 2. So, in FIG. 6, the length of each wire duct 14 corresponding to each of the multiple lamp boards 2 are substantially the same, ensuring a substantially identical voltage drop among all the wires and a uniform driving voltage and illumination of the LED lamps on each lamp board.

The backlight module according to some embodiments of the present disclosure includes the multiple lamp boards and the a backplane. A plurality of LED lamps are arranged in an array on the first surface of the lamp board. At least one wire terminal of the LED lamps is disposed on the second surface of the lamp board. The plurality of LED lamps are electrically connected with the at least one wire terminal, and the at least one wire terminal is configured for external electrical connection. The backplane may face the second surface of the lamp board. At least one receptacle structure corresponding to the at least one wire terminal is formed on the backplane. The at least one wire terminal is disposed and accommodated in the receptacle structure. At least one wire duct or wire routing structure is disposed on the backplane, which is provided for accommodating the at least one external wire connected with the at least one wire terminal. In the backlight module according to the present disclosure, the at least one wire terminal of the LED lamps is accommodated in the backplane, and the receptacle structure and the wire duct are disposed on the backplane, with the at least one wire terminal embedded in the least one receptacle structure, and the at least one external wire disposed in the at least one wire duct. When the LED lamps are connected to the at least one wire terminal, the at least one external wire is arranged on the second surface of the at least one lamp board, the at least one external wire between the at least one wire terminal and the driving module on the backplane is embedded or accommodated in the at least one wire duct. Such arrangement of the external wire effectively reduces the fitting gap between the lamp board and the backplane, and significantly reduces the overall thickness of the backlight module.

Figure 9:
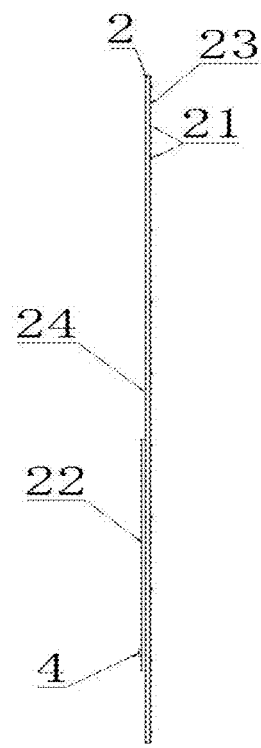
FIG. 9 is a cross-sectional diagram of a structure of a lamp board in another backlight module according to some embodiments of the present disclosure.
Figure 10:
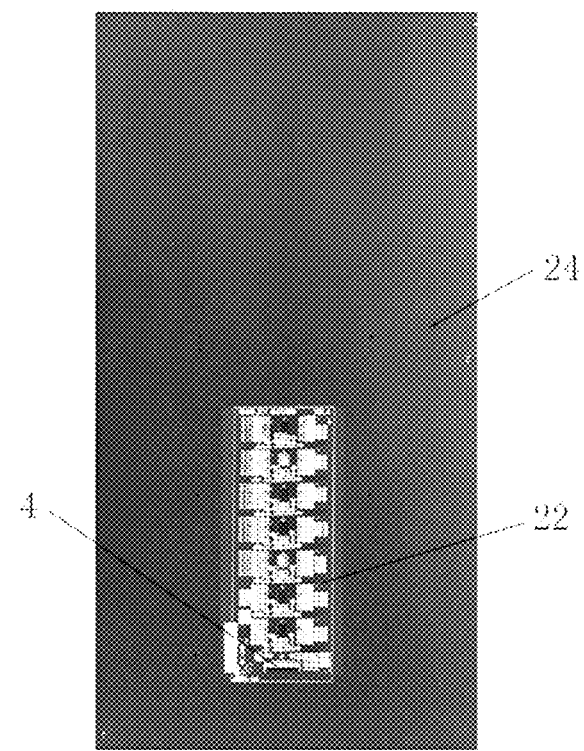
FIG. 10 is a schematic diagram of a second surface of a lamp board in another backlight module according to some embodiments of the present disclosure.

In some other embodiments of the present disclosure, as shown in FIG. 9, the backlight module includes at least one lamp board 2. An array of LED lamps 21 are disposed on a first surface 23 of the at least one lamp board 2. At least one wire terminal 4 and a driving module 22 for the at least one lamp board 2 are disposed on the second surface 24. As shown in FIG. 10, the LED lamps 21 are electrically connected to the driving module 22 through the at least one wire terminal 4.

In the backlight module, both the at least one wire terminal 4 and the driving module 22 are disposed on the second surface 24 of the at least one lamp board 2, thereby realizing the integration of the LED lamps 21 with the at least one wire terminal 4 and the driving module 22. Specifically, the at least one wire terminal 4 disposed on the second surface 24 is electrically connected to the LED lamps 21 disposed on the first surface 23; the driving module 22 disposed on the second surface 24 is electrically connected to the at least one wire terminal 4 on the same surface, thus realizing the electrical connection between the driving module 22 and the LED lamps 21, with the lamp panel driving module 22 for driving the LED lamps 21.

The above integrated structure does not include the driving module on the backplane, thereby reducing the number of the connection wire and the circuit boards (including, for example, the driving module, a connection lamp board and a power board for controlling each of the lamp boards) on the backplane, further reducing the percentage area of the circuit boards on the backplane, so that the unoccupied area of the backplane is increased, and the backplane may be used as a back cover of the backlight module, thereby effectively reducing the thickness of the backlight module.

Figure 11:
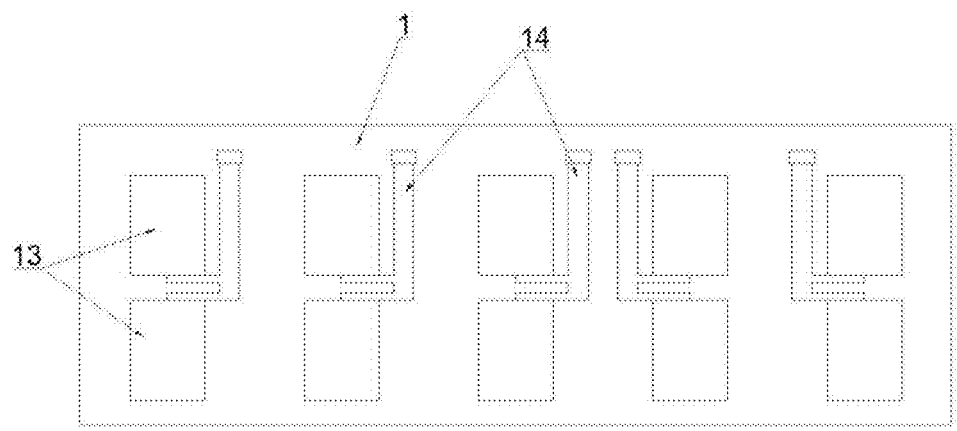
FIG. 11 is a schematic diagram of a structure of a backplane in another backlight module according to some embodiments of the present disclosure.

The backlight module according to the present disclosure further includes a backplane 1 at a side facing the second surface 24 of the lamp board 2. As shown in FIG. 11, the backplane 1 is provided with at least one receptacle structure corresponding to both a driving module 22 and at least one wire terminal 4. The wire terminal 4 and the driving module 22 are both embedded in the receptacle structure, thereby accommodating the wire terminal 4 and the driving module 22 on the backplane 1. In some examples of the present disclosure, the receptacle structure is in the form of a recess. When assembling the backplane 1 and the lamp board 2, the wire terminal 4 and the driving module 22 are embedded and accommodated in the receptacle structure 13, which helps reduce a gap between the lamp board 2 and the backplane 1 and thus helps reduce the overall thickness of the backlight module. Besides, the driving module is integrated into the back surface of the lamp board, without occupying the outside surface of the backplane when assembling the driving module. Compared with the related art where an additional large back cover structure on the outside of the backplane is needed, in the embodiments of the present disclosure, only a small back cover is needed, thus making the television thinner and more aesthetic.

In addition, at least one wiring duct or wire routing structure 14 is disposed on the backplane 1, and is configured to accommodate the at least one external wire connected to the at least one wire terminal 4. In other words, the at least one external wire connected to the wire terminal 4 on the second surface 24 of the lamp board 2 may be embedded, organized, routed, and hidden in the wiring duct 14, thereby reducing a fitting gap between the backplane 1 and the lamp board 2.

In some embodiments of the present disclosure, the backplane 1 is not limited to a one-layer structure but may also be provided as a two-layer composite structure. For example, a backplane 1 may include an exterior backplane 11 and an inner backplane 12 coupled to the exterior backplane 11. The at least one receptacle structure may be located on the inner backplane 12, e.g., the at least one wire terminal 4 and the driving module are accommodated in the receptacle structure of the inner back late 12. In the embodiments of the present disclosure, the receptacle structure on the inner backplane 12 is in the form of an aperture or a recess. For ease of processing, the receptacle structure may be formed by punching out an aperture on the inner backplane.

At least one wire routing structure is formed on the inner backplane, and configured to route and accommodate the at least one external wire connected to the at least one wire terminal 4. By setting the connecting wire in the wire routing structure of the inner backplane 12, the at least one external wire is better organized, thereby rendering the backlight module more aesthetically pleasing in that the at least one external wire are not disorderly placed outside the exterior backplane 11. In some examples, the wire routing structure may be implemented in the form of a recess or an aperture on the back plane.

In some embodiments of the present disclosure, a plurality of lamp board 2 are included to meet the required number of LED lamp in the backlight module. Accordingly, as shown in FIG. 11, a plurality of receptacle structures 13 are correspondingly provided on the backplane. The position of the wire terminals of the lamp board 2 and the arrangement of the corresponding wiring ducts are similar to those described in the above embodiments. Further description is omitted.

In the backlight module according to the embodiments of the present disclosure, the LED lamps, the at least one wire terminal, and the driving module are disposed on the lamp board, such that the LED lamps are integrated with the at least one wire terminal and the driving module, and the driving module is no longer disposed on the backplane. This greatly reduces the percentage area of the backplane occupied by circuit boards, and an area of the backplane that is exposable increases. As such, the backplane is capable of being directly exposed as a back cover, without using an additional large back cover to cover the backplane, thereby effectively improving the aesthetic appearance of the backlight module. Moreover, the at least one wire terminal and the at least one driving module are accommodated in the receptacle structure of the backplane, reducing the space occupied by the external wire between the lamp board and the backplane, thereby effectively reducing the thickness of the backlight module and facilitating production of thin televisions.

Figure 12:
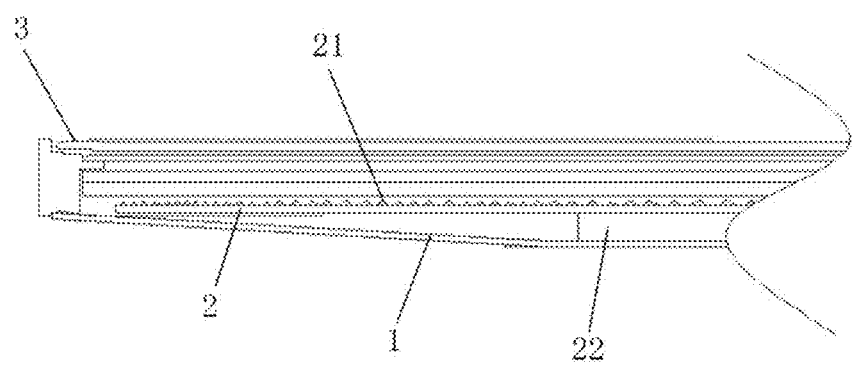
FIG. 12 is a cross-sectional diagram of a structure of a display terminal according to some embodiments of the present disclosure.

Based on the backlight module according to some embodiments of the present disclosure, a display terminal is further provided. As shown in FIG. 12, the display terminal includes the above-mentioned backlight module and the display panel 3 disposed in the light emitting direction of the backlight module. Optionally, in the backlight module, the at least one wire terminal, the LED lamps 21 and the driving module 22 are disposed on the at least one lamp board 2, and the area on the backplane 1 needed for disposing the driving board is reduced, such that the backplane may be directly exposed as a back cover of the backlight module, therefore the overall thickness of the display terminal is reduced, yielding thinner television devices.

In this specification, terms such as "include", "comprise", or any other variants thereof refer to a non-exclusive inclusion, such that a circuit structure, an object or a device that comprises a series of elements doesn't merely comprises those elements but also other elements not explicitly listed, or elements that are inherent to such circuit structures, objects, or devices. In the absence of more limitations, elements defined by the phrase "comprising a . . . " don't exclude the presence of additional equivalent elements in the circuit structures, objects, or devices that comprise the said elements.

Other embodiments of the present disclosure will be readily apparent to those of ordinary skill in the art; The disclosure is intended to cover any variations, uses, or adaptations of the disclosure, which are in accordance with the general principles of the disclosure and include common general knowledge or common technical means in the art that are not disclosed herein. The specification and examples are to be considered as illustrative only, and the scope and spirit of the disclosure are indicated by the claims.

The invention claimed is:

1. A backlight module, comprising:
   at least one lamp board, comprising a first surface and a second surface opposite to the first surface;
   a plurality of light emitting diode (LED) lamps arranged in an array on the first surface;
   at least one wire terminal disposed on and attached to the second surface and electrically connected to the plurality of LED lamps;
   a backplane facing the second surface of the lamp board;
   at least one receptacle structure formed on the backplane, wherein the at least one lamp board is coupled to the backplane such that the at least one wire terminal is accommodated in the at least one receptacle structure; and
   at least one wire routing structure formed on the backplane, configured to accommodate and route at least one external wire connected to the at least one wire terminal, wherein the at least one external wire are configured to connect the at least one wire terminal with a driving module for the LED lamps.

2. The backlight module according to claim 1, wherein the driving module is disposed on the second surface of the lamp board and configured to control light emission of the plurality of LED lamps.

3. The backlight module according to claim 2, wherein the driving module is accommodated in the at least one receptacle structure.

4. The backlight module according to claim 1, wherein the at least one receptacle structure comprises an aperture structure or a recess structure formed on the backplane.

5. The backlight module according to claim 1, wherein the backplane comprises:
   an exterior backplane; and
   an inner backplane fixed to the exterior backplane;
   wherein the at least one receptacle structure is formed on the inner backplane.

6. The backlight module according to claim 5, wherein the at least one wire routing structure is formed on the inner backplane and configured to accommodate the at least one external wire connected to the at least one wire terminal.

7. The backlight module according to claim 6, wherein the at least one wire routing structure comprises a recess structure or an aperture structure formed on the inner backplane.

8. The backlight module according to claim 5, wherein a thickness of the inner backplane ranges between 1.0 mm and 4.0 mm.

9. A display device, comprising:
a driving module;
a backlight module, and
a display panel disposed facing a light emitting direction of the backlight module;
wherein the backlight module comprises:
at least one lamp board, comprising a first surface and a second surface opposite to the first surface;
a plurality of light emitting diode (LED) lamps arranged in an array on the first surface;
at least one wire terminal disposed on and attached to the second surface and electrically connected to the plurality of LED lamps;
a backplane facing the second surface of the lamp board;
at least one receptacle structure formed on the backplane, wherein the at least one lamp board is coupled to the backplane such that the at least one wire terminal is accommodated in the at least one receptacle structure;
at least one wire routing structure formed on the backplane, configured to accommodate and route at least one external wire connected to the at least one wire terminal; and
the at least one external wire are configured to connect the at least one wire terminal with the driving module for the LED lamps.

10. The display device according to claim 9, wherein the driving module is disposed on the second surface of the lamp board and configured to control light emission of the plurality of LED lamps.

11. The display device according to claim 10, wherein the driving module is accommodated in the at least one receptacle structure.

12. The display device according to claim 9, wherein the at least one receptacle structure comprises an aperture structure or a recess structure formed on the backplane.

13. The display device according to claim 9, wherein the backplane comprises:
an exterior backplane; and
an inner backplane fixed to the exterior backplane;
wherein the at least one receptacle structure is formed on the inner backplane.

14. The display device according to claim 13, wherein the at least one wire routing structure is formed on the inner backplane and configured to accommodate the at least one external wire connected to the at least one wire terminal.

15. The display device according to claim 14, wherein the at least one wire routing structure comprises a recess structure or an aperture structure formed on the inner backplane.

16. The display device according to claim 13, further comprising: wherein a thickness of the inner backplane ranges between 1.0 mm and 4.0 mm.

* * * * *

UNITED STATES PATENT AND TRADEMARK OFFICE
CERTIFICATE OF CORRECTION

PATENT NO. : 11,150,510 B2
APPLICATION NO. : 16/563134
DATED : October 19, 2021
INVENTOR(S) : Zhiqiang Tang et al.

It is certified that error appears in the above-identified patent and that said Letters Patent is hereby corrected as shown below:

On the Title Page

Item (71), after Applicant: and before (CN), delete "Qingdao Hisense Electronics Co., Ltd., Shandong" and insert -- Hisense Visual Technology Co., Ltd., Qingdao --

Item (72), after Zhiqiang Tang, and before Shandong, insert -- Qingdao --

Item (72), after Jianguo Han, and before Shandong, insert -- Qingdao --

Item (72), after Ji Ma, and before Shandong, insert -- Qingdao --

Item (72), after Yu Chen, and before Shandong, insert -- Qingdao --

Signed and Sealed this
Eighth Day of February, 2022

Drew Hirshfeld
*Performing the Functions and Duties of the
Under Secretary of Commerce for Intellectual Property and
Director of the United States Patent and Trademark Office*